United States Patent Office 3,547,853
Patented Dec. 15, 1970

3,547,853
DRY POLYMER/CEMENT COMPOSITIONS
Michael Kalandiak, Ambler, Pa., assignor to Rohm and Haas Company, Philadelphia, Pa., a corporation of Delaware
No Drawing. Filed Sept. 20, 1967, Ser. No. 669,264
Int. Cl. C08f 45/36
U.S. Cl. 260—29.6                          11 Claims

ABSTRACT OF THE DISCLOSURE

Improved cement compositions involving the incorporation therein of a dry redispersible acrylic polymer, an aliphatic hydroxycarboxylic acid set-retarding agent that also serves as a sequestrant, and trimethylol propane, trimethylol ethane, or a mixture of the latter two compounds.

---

It has been previously proposed to incorporate various vinyl addition polymers into cement compositions for the purpose of modifying the properties of the resulting compositions. Polymers of various types have been suggested to be incorporaed and naturally one of those that is most commonly referred to for this purpose is polyvinyl acetate (see U.S. 2,733,995) because of its inexpensiveness and ready availability. However, the improvement in properties obtainable by the incorporation of this type of polymer is rather limited. The use of acrylic polymers in the form of aqueous dispersions has also been suggested with or without such plasticizers as dibutyl phthalate and tricresyl phosphate. These compositions provide improved results as compared to polyvinyl acetate but have the disadvantages of requiring the user to mix the aqueous dispersion with the cement and also the requirement for separate packaging of two components; namely, a paper bag or carton for the dry cement and a bottle for the aqueous polymer dispersion.

U.S. 3,196,122, for example, employs latices of acrylic emulsion polymers having a glass transition temperature or second order transition temperature below room temperature. This patentee states:

"It is not practical to use a polyacrylate polymer with a glass transition temperature above ambient temperature in conjunction with a plasticizer for such polymer in an attempt to improve the adhesive properties of the polymer because plasticizers reduce the bond of the latex to the cement and thus reduce the strength of the cured cementitious composition, both in tension and compression, and also lower the adhesive strength." (Column 14, lines 4 to 12.)

Polyacrylic emulsion polymers were mixed with cementitious materials but such a polymer was generally mixed therewith as an aqueous dispersion at the time of preparation of the mortar or the like for immediate use in order to assure thorough distribution of the polymer particles with the other materials making up the cement composition. If the acrylic polymer dispersion were dried, the polymer particles would coalesce because of their second order transition temperature which made them form a film on drying even at room temperature. This would interfere with the distribution of the polymer through the dry powdered cement materials and the coalesced polymer would not be redispersed to small particles when the mixture is later mixed with water at the time it is to be used. If an aqueous dispersion of a harder acrylic polymer having a second order transition temperature above room temperature were used with such plasticizers as previously recommended, e.g. dibutyl phthalate or tricresyl phosphate, drying would again cause coalescence and interfere with distribution and redispersion when it is desired to use the cement composition.

British Pat. 1,045,596 discloses the preparation of a dry, one-package cementitious composition modified by an acrylic polymer but on setting, such compositions shrink and develop small cracks or fissures throughout the body of cured cement mass. This gives rise to ready penetration of water and the presence of the cracks tends to cause a slow, progressive disintegration of the cement.

Applicant has discovered that a highly practical and satisfactory one-package composition of dry nature that is stable over long periods of time under normal conditions of storage and produces cured formed masses without shrinkage cracks, can be formed from a mixture comprising (1) a dry inorganic material comprising a cement and, if desired, aggregates, such as sand and/or gravel, (2) a dry redispersible acrylic polymer having a second order transition temperature of at least 30° C., and (3) trimethylol ethane, trimethylolpropane, or a mixture thereof. The latter component (3) may be generically designated trimethylol-$(C_1$–$C_2)$-alkane and may be hereinafter referred as TMA. When the dispersible acrylic polymer contains hardening metal ions, an alkali metal salt of an aliphatic hydroxy carboxylic acid is added to sequester the metal ions and to retard the setting of the cement. When a more rapid cure of compositions containing the sequestrant-retarder is desired, there may be included an agent to accelerate the setting of the cement, such as an alkali metal carbonate.

The acrylic polymer employed in the present invention may be any water-insoluble emulsion polymer of one or more esters of acrylic acid or methacrylic acid or such a polymer containing about 1% to 10% but preferably not over 5% by weight, based on the total monomer weight, of an $\alpha,\beta$-monoethylenically unsaturated acid, provided the polymer is redispersible in aqueous media and has a second order transition temperature, $T_i$, of at least 30° C. The ester may be any ester of acrylic acid or methacrylic acid with an alcohol having 1 to 8 or even 10 to 12 carbon atoms. When a soft monomer is used, such as an acrylic acid ester of an alcohol having one or more carbon atoms, or a methacrylic acid ester of an alcohol having more than 3 carbon atoms, it is frequently desirable and sometimes even necessary to include in the acid copolymer, units of a hardening monomer, that is one which when polymerized alone, forms a hard polymer having a $T_i$ over 30° C. Examples of such monomers are the $(C_1$–$C_3)$-alkyl methacrylates, especially methyl methacrylate, also vinyl acetate, acrylonitrile, styrene, vinyl toluene, vinyl chloride, and vinylidene chloride. Sufficient of the latter hardening monomers is used to assure that the $T_i$ of the resulting acid copolymer is at least 30° C. up to 50° C., and preferably is in the range from about 30° C. to 35° C. Generally, the total amount of such hardening monomers, other than the methacrylates, should not exceed 40% by weight.

When an acid is present in the copolymer, it may be any acid mentioned in the British patent supra. However, acrylic acid or methacrylic acid is generally preferred.

The $T_i$ value referred to is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The copolymer is dried to form a powder thereof redispersible in water or in an aqueous solution of a sequestrant to form a dispersion of polymer particles which are preferably of essentially the same size as the particles in the original dispersion formed by emulsion polymerization. The drying may be accomplished by a spray-drying system and may be carried out in an ambient atmosphere having a temperature well below the $T_1$ of the polymer so that drying results in the production of fine particles with little or no coalescence or agglomeration between particles. When the dispersion contains an emulsifier having acid groups or a copolymer containing acid groups, these groups may be neutralized with hardening metal ions, as disclosed in the British patent supra before spraying. Alternatively, instead of neutralizing with the hardening ions before spraying the acid copolymer dispersion, the latter may be sprayed and the spray commingled with a spray of an aqueous solution of a hydroxide or basic salt of the hardening metal, preferably a polyvalent metal. The commingling of the atomized or sprayed polymer solution and alkaline solution neutralizes the polymer when it contains acid or may neutralize any acid dispersant present and prevents coalescence of the polymer particles even when the spray-drying is effected in an atmosphere heated as high as 180 to 200° C. or so. Any polyvalent metal may be employed as mentioned in the British patent supra, especially those in Groups II–A, II–B, III–A, and IV–B, of the Periodic Chart of the Elements (Handbook of Chemistry and Physics, 35th edition, published by Chemical Rubber Publishing Co., 1953, pp. 392–393). Calcium, magnesium, barium, strontium, aluminum, zinc, and zirconium are generally preferred.

Any of the dried acrylic polymer products disclosed in the British Pat. 1,045,596 may be used herein provided an alkali metal salt of an aliphatic hydroxycarboxylic acid is also incorporated therein. The latter functions to retard the setting of the cement and also serves as a sequestering agent for the hardening metal ions whether they are monovalent or polyvalent metal ions when such ions are present in the redispersible acrylic polymer. It is important that this type of retarding agent be used. Examples of these agents are sodium lactate, sodium glycolate, sodium gulconate, sodium tartrate, and sodium citrate or the corresponding potassium or lithium salts. The citrate is preferred because of its availability, cost, and efficiency. The retardation of the setting of the cement is essential to allow time for the dried hardening-metal-containing polymer material to redisperse and the TMA supra to coact and relieve tensions as they are developed during curing so that cracking during setting is prevented. Such well-known sequestering agents as the sodium salts of polyaminopolyacetic acids are ineffective in promoting the desired cement-modifying activity of the polymer apparently because they do not retard the setting of the cement.

When the redispersible acrylic polymer is a salt of hardening metal ions, the amount of the alkali metal hydroxy-aliphatic carboxylic acid necessary to sequester these metal ions sometimes results in excessive retardation of the setting of the cement. In such instances, an agent for accelerating the setting thereof is preferably added. Suitable agents include alkali metal hydroxide or carbonates, such as sodium or potassium carbonate.

The proportion of acrylic polymer should be from about 3 to about 20% by weight, based on the weight of the cement itself whether it is a neat cement or a compounded cement mixture.

The amount of the sequestrant-retarding agent may be from 5 to 20% by weight, based on the weight of acrylic polymer. The amount of the sequestrant, when used, should be approximately the stoichiometric equivalent of the metal ions, say within 10% of that equivalent. When a cure-accelerator is used to offset excessive retardation by the sequestrant, sodium carbonate is generally preferred and may be used in amounts of about 5 to 25% by weight, based on the weight of polymer.

The amount of TMA supra should be from 1 to 50% by weight, based on the weight of the polymer. The amount should not exceed the limit of compatibility of the TMA with the polymer and in most cases will not exceed about 20% by weight of the polymers, and is preferably about 10 to 15% by weight thereof.

The expression "hydraulic cement" is intended to include all such chemical combinations of lime, silica, and alumina, or of lime and magnesia, silica and alumina and iron oxide (magnesia for example may replace part of the lime, and iron oxide a part of the alumina), as are commonly known as hydraulic natural cements. Hydraulic natural cements include grappier cements, pozzolan cements, natural cements, Portland cements, white cements, and aluminous cements. Pozzolan cements include slag cements made from slaked lime and granulated blast furnace slag. Because of its superior strength, Portland cement is preferred among the hydraulic natural cements. In addition to the ordinary construction grades of Portland cement or other hydraulic natural cements, modified hydraulic natural cements and Portland cements designated as high-early-strength cement, heat-resistant cement, and slow-setting cement may be used in the present invention. Among the Portland cements, it is to be noted especially that any of the ASTM types I, II, III, IV, and V may be employed.

The order of addition of the various ingredients is not critical for various commercially acceptable mixing procedures are suitable for purposes of the invention.

Frequently, it is advantageous to incorporate sand in the mixture. The nature of the sand will be dictated by the intended use of the product. For masonry paints or plasters, it is possible to use any kind of sand of small particle size, preferably one having a diameter of one millimeter or less. On the other hand, where the product is subject to exacting requirements, as in the case of a cement patch applied to an existing concrete floor, graded sands of medium particle size such as "Ottawa" sand and "Best" sand or a mixture of the two may be used to better advantage. Ottawa sand is a silica sand of the type referred to as "round." Best sand is of the type known as "sharp." In both cases, fines will have been removed. In general, however, the sieve size of the sand may vary over a fairly wide range.

In lieu of or in addition to sand, it is possible to use ground glass, emery powder, diatomaceous earth, ground slag, fine gravel, trap rock and similar aggregates.

It is often advantageous to incorporate in the mixture, with or without sand, a minor fraction of clay; if so, the clay may take the form of kaolin or china clay, porcelain clay, fire clay, pipe clay, bentonite, and in fact, almost any of the known types of clay. Because the type of clay sometimes has an effect on the water demand of the cement, it is occasionally desirable to avoid the use of clays which markedly increase the water demand. If, for example, a pasty mixture is desired (as opposed to a thin, fluid product), kaolin and similar clays will be preferred to bentonite, although the latter may be used to excellent advantage where a low water content is not a controlling factor. As a rule, the use of clay is desirable in a stiff paste, such as that used for cement patching purposes, this for the reason that the clay tends to enhance the workability of the mixture. In some cases, it serves also to reduce the setting time.

Various other substances may be added to the cementitious material, particularly in its more concentrated forms; for example, sodium silicate, type GD, which helps promote dry and wet adhesion. However, materials such as carboxy methyl cellulose, methyl cellulose, ethyl cellulose, ammonium polyacrylate, etc. may be incorporated for thickening purposes or for the purpose of improving the workability, finish or both. For example, dry compositions of the present invention which also contain methyl cellulose may be used as mortars for ceramic tile. The compositions of U.S. Pat. 2,990,382 may be made in which the polyvinyl acetate is replaced by the polymer of the present invention along with the TMA supra, and the aliphatic hydroxycarboxylic acid. The compositions of U.S. Pats. 2,820,713 and 2,934,932 may also be modified by addition of the polymer of the present invention along with the TMA and optionally the aliphatic hydroxycarboxylic acid. Although organic in nature, the various thickening agents and cellulose derivatives mentioned are not detrimental, i.e., they do not, so far as known, impair the acid-resistance characteristics of the final product. Inorganic reinforcing materials such as iron filings, asbestos fibres, glass fibres, etc. may be included or excluded as desired. Numerous other materials may be introduced into the mixture for these and other similar purposes including antimycotics, antifoams, water-reducing agents and the like.

When making concrete structures or floor coverings by the present invention, which compositions contain large amounts of crushed trap rock or other aggregate and substantial amounts of sand, it has been discovered that extremely good wet strengths accompanied with good dry strength can be obtained provided that the amount of the hydraulic cement is substantially greater than the amount of sand and preferably 1.5 to 2 or 3 times the amount of sand. Excellent results are obtained in concrete compositions comprising one part of sand, 1.5 to 2.5 parts of a hydraulic cement, an amount of rock or aggregate in excess of the amount of said cement and preferably not in excess of 4 parts.

When forming pastes or plasters (paints), the coarse aggregate must, of course, be eliminated. If it is desired to form relatively thick wall coatings, it is desirable to add a thickener such as polyacrylic acid. For some reason, the plastering compositions of the present invention are capable of providing wall coatings as thick as ½ inch whereas, prior to this invention, it was not practical to form cementitious wall coatings with a thickness greater than about ¼ or ⅜ inch.

If the cementitious compositions are to be used in forming very thin layers, the amount of said can be reduced or eliminated and it is often desirable to employ a flowing agent such as ammonium caseinate or other alkaline caseinate. The amount of water can be increased to improve the flowability, but excessive amounts of water reduce the strength of the final product.

The present invention is particularly important in the field of wall coverings because of the ability to form thick layers. The invention is also important in the masonry field because of the high tensile and adhesive strengths.

Depending upon the intended nature of the product, the amount of water used with the cement may vary over a very wide range. If, for example, the product is to be used as a masonry paint or plaster, large quantities of water can be used to disperse the cement. In the case of grouts, which are generally somewhat thicker than paints but still highly fluid, a lesser quantity of water can be used. Where the purpose is to provide an adhesive, the amount of water may be still further reduced. Usually the quantity of water will be at its minimum if the product is intended for the construction of new walls, ceilings, floors or the like for use as a mortar, patching cement or the like. In general, the minimum quantity of water consonant with good working properties will be preferred because of the common tendency of excessive water to impair the physical properties of hydraulic cements.

The proportion of copolymer may be chosen to provide the optimum properties in particular situations. For example, in a neat grout, that is a grout consisting essentially of the cement, water, and the polymer, the amount of polymer is preferably from 5 to 10% by weight of the cement. This particular type of composition is especially useful in oil well cementing to prevent intrusion of water and to provide good adhesion of the cement to the casing pipe.

In preparing a bonding neat grout, which is intended to be flowed over an old base, such as of masonry, concrete, or mortar, as a slurry to provide a bonding layer over which the new concrete or mortar is laid, the proportion of polymer may be from 5 to 25% by weight of the cement and is preferably from 5 to 10% by weight thereof.

In cements comprising aggregate, such as sand, gravel, and so on, intended for use as a topping cement, the proportion of polymer employed is preferably from 10 to 20% by weight, based on the weight of cement in the composition.

The dry compositions of the present invention are thoroughly mixed and then packaged in a suitable container, such as a paper bag or carton. When the time for use arises, the composition is merely mixed with water and then applied as a mortar, grout, adhesive, patching plaster, or as a concrete-forming mass.

Cement compositions comprising the copolymer in accordance with the present invention are adapted to be cured either (1) by exposure to air such as for a period of several days including from 2 to 7 days or more, or (2) curing by initial exposure to ambient atmospheric conditions followed with complete soaking or submersion under water. Even when cured while being subjected simply to air, the compositions of the present invention result in the production of cement or concrete products having improved adhesion to any substrate employed, particularly to old concrete, and satisfactory compressive, tensile, and flexural strengths. In the topping or resurfacing of old cement or concrete surfaces, the composition of the present invention can be applied in any desired thickness and may even be as thin as $\frac{1}{16}$ inch to 1 inch with adequate adhesion to the old surface. Even with air curing, such toppings acquire usable toughness in a very short time and may be put in service in a period of 8 to 24 hours after initial laying even when the topping is subjected to such severe wear conditions as occur in the case of a floor or walk. The compositions of the present invention, as compared to previous cement compositions comprising polyvinyl acetate and a butadiene/styrene copolymer, generally provide better mechanical properties, such as tensile, compressive, and/or flexural strengths and improved adhesion to old surfaces.

In the following examples, the parts and percentages are by weight unless otherwise specifically indicated.

EXAMPLE 1

Cement mortar for patching of topping

| Ingredient: | Parts |
| --- | --- |
| Sand | 250.0 |
| Type I Portland cement | 100.0 |
| Redispersible polymer [1] | 10.0 |
| Sodium citrate | 1.7 |
| Sodium carbonate | 0.5 |
| Defoamer (Colloid 513–DD) (optional) | 0.25 |
| Asbestos | 1.0 |
| Trimethylol propane | 1.0 |

[1] Calcium salt of a copolymer ($T_1=32°$ C.) of 46% ethyl acrylate, 49% methyl methacrylate, and 5% by weight methacrylic acid prepared as in British Pat. 1,045,596.

Any or all of the several ingredients may be mixed together to provide a dry composition that is storage-stable and can be sold and shipped to the user who mixes it with water to the proper consistency for use.

The following table in columns (a), (b), (c), (d), and (e) respectively provides comparative data as to the physical properties of cured products obtained from:

(a) an unmodified cement mortar—same as that of Example 1 above but no polymer and no trimethylolpropane, (b) the mortar of (a) plus powdered polyvinyl acetate, (c) the mortar of (a) plus latex of film-forming copolymer essentially of ethyl acrylate, methyl methacrylate and about 1% methacrylic acid ($T_1=12$–$13°$ C.), (d) the mortar of Example 1 above, but without the trimethylolpropane, and (e) the mortar of Example 1 as set forth hereinabove.

In all the mortars, the sand/cement ratio is 2.5/1 and the water content is controlled to give mortars of equal consistency. In all of the mortars modified by a polymer, the polymer/cement ratio is 1/10.

The test measurements given in the table were made on dry cured products after curing 7 days in air at 25° C. and 50% relative humidity except the wet test measurements given were made on products cured 7 days at 25° C. and 50% relative humidity, then totally immersed in water at 25° C. for 7 days, and then tested wet.

PROPERTIES OF CEMENT MORTARS

|  | (a) | (b) | (c) | (d) | (e) |
|---|---|---|---|---|---|
| Tensile strength, p.s.i. | 315 | 535 | 555 | 510 | 540 |
| Wet | 435 | 185 | 305 | 385 | 325 |
| Compressive strength, p.s.i. | 3,750 | 2,930 | 3,415 | 3,425 | 3,305 |
| Wet | 4,165 | 1,465 | 2,925 | 4,715 | 4,430 |
| Flexural strength, p.s.i. | 575 | 985 | 1,165 | 1,165 | 1,195 |
| Shear bond strength, p.s.i. | 90 | 265 | 510 | 355 | 410 |
| Wet | 285 | 50 | 290 | 460 | 415 |
| Impact strength, inch pounds | 6±1 | 13±4 | 22±9 | 11±2 | 17±2 |
| Abrasion resistance, percent weight loss [1] | 20.2 | 8.1 | 2.1 | 2.1 | 2.0 |

[1] Lower values indicate better abrasion resistance.

EXAMPLE 2

Cement based masonry paint

| Ingredient: | Parts |
|---|---|
| Silica flour No. 120 | 95.0 |
| Titanium dioxide | 5.0 |
| White Portland cement (Type I) | 100.0 |
| Polymer of Example I hereinabove | 10.0 |
| Sodium citrate | 1.7 |
| Sodium carbonate | 2.5 |
| Defoamer (optional) | 0.25 |
| Hydroxyethyl cellulose (4400 cps. grade) | 0.225 |
| Trimethylol propane | 1.0 |

EXAMPLE 3

Mortar for setting ceramic tile

| Ingredient: | Parts |
|---|---|
| Sand | 200.0 |
| Type I Portland cement | 100.0 |
| Redispersible polymer [1] | 10.0 |
| Sodium citrate | 1.7 |
| Sodium carbonate | 0.5 |
| Defoamer (Colloid 513-DD) (optional) | 0.25 |
| Methyl cellulose (4000 cps. grade) | 0.75 |
| Trimethylol propane | 1.0 |

[1] Aluminum salt of a copolymer of 30% butyl acrylate, 20% acrylonitrile, 40% methyl methacrylate, and 10% acrylic acid prepared in British Pat. 1,045,596.

EXAMPLE 4

Grout for ceramic tile

| Ingredient: | Parts |
|---|---|
| Titanium dioxide | 5.0 |
| White Portland cement (Type I) | 100.0 |
| Silica flour No. 120 | 100.0 |
| Redispersible polymer [1] | 10.0 |
| Sodium citrate | 1.7 |
| Sodium carbonate | 2.5 |
| Defoamer (Colloid 513-DD) (optional) | 0.25 |
| Trimethylolethane | 1.0 |
| Methyl cellulose (100 cps. type) | 1.0 |

[1] Zinc salt of a copolymer of 25% 2-ethylhexyl acrylate, 55% styrene, 12% vinyl acetate, and 8% methacrylic acid.

It is surprising that the cured compositions of the present invention have, under both wet and dry conditions, good physical properties, such as tensile, compressive, and flexural strengths, adhesive strength, and abrasion-resistance since the TMA is water-soluble. It is also surprising that the cured compositions obtained from the dry compositions of the present invention retain the good physical properties over long periods of time in spite of repeated subjection to rain and other weathering influences.

I claim:

1. As a composition of matter, a dry particulate mixture comprising a hydraulic cement, about 3 to 20% by weight, based on the weight of the cement, of a dry polyvalent metal salt of a redispersible copolymer of monoethylenically unsaturated monomers comprising 1 to 10% by weight of at least one α,β-monoethylenically unsaturated acid such that the copolymer has a second order transition temperature of at least 30° C., an alkali metal salt of an aliphatic hydroxycarboxylic acid selected from the group consisting of the sodium, potassium and lithium salts of lactic, glycolic, gluconic, tartaric and citric acids, and 1 to 50% by weight, based on the weight of the polymer, of discrete particles of trimethylol propane, trimethylol ethane, or a mixture thereof.

2. A composition as defined in claim 1 in which the amount of hydroxycarboxylic acid salt is 5 to 20% by weight, based on the weight of polymer.

3. A composition according to claim 1 which contains sand, gravel, or other aggregate.

4. A composition as defined in claim 2 which comprises 5 to 25% by weight, based on the weight of the polymer, of an alkali metal carbonate.

5. A composition according to claim 4 in which the amount of aliphatic hydroxycarboxylic acid salt is within 10% of the stoichiometric equivalent weight of the polyvalent metal ions.

6. A composition according to claim 5 in which the hydroxycarboxylic acid salt is sodium citrate.

7. A composition according to claim 1 in which the trimethylolalkane is trimethylolethane.

8. A composition according to claim 2 in which the trimethylolalkane is trimethylolpropane.

9. A composition according to claim 8 in which the polymer is a copolymer of acrylic acid or methacrylic acid.

10. A composition according to claim 8 in which the polymer is a copolymer of (a) at least one ester selected from the esters of acrylic acid with an alcohol having at least one carbon atom or the esters of methacrylic acid with an alcohol having more than 3 carbon atoms, (b) at least one monomer selected from $(C_1-C_3)$alkyl methacrylates, vinyl acetate, acrylonitrile, styrene, vinyltoluene, vinyl chloride, and (c) about 1 to 10% by weight of at least one α,β-monoethylenically unsaturated acid.

11. A composition according to claim 10 which contains sand, gravel, or other aggregate.

References Cited

UNITED STATES PATENTS

| 3,196,122 | 7/1965 | Evans | 260—29.6 |
| 3,256,229 | 6/1966 | Janota et al. | 260—41 |
| 3,360,493 | 12/1967 | Evans | 260—29.6 |
| 3,361,702 | 1/1968 | Wartman et al. | 260—33.4 |

FOREIGN PATENTS

| 1,045,596 | 10/1966 | Great Britain | 260—29.6 |

OTHER REFERENCES

Chemical Abstracts, vol. 68, par. 13731t (in re: Japan, 2069 (1967), Jan. 30, 1967.

MORRIS LIEBMAN, Primary Examiner

S. M. PERSON, Assistant Examiner

U.S. Cl. X.R.

117—16; 252—8.55; 260—31.2, 41